United States Patent [19]

Saito et al.

[11] Patent Number: 5,430,086
[45] Date of Patent: Jul. 4, 1995

[54] RUBBER COMPOSITION FOR TIRE TREADS

[75] Inventors: Yuichi Saito, Kobe; Toru Fukumoto; Shuji Imaoka, both of Akashi; Keisaku Yamamoto, Ichihara; Kizuku Wakatsuki, Ichihara; Mitsuji Tsuji, Ichihara, all of Japan

[73] Assignees: Sumitomo Rubber Industries, Hyogo; Sumitomo Chemical Co., Ltd., Osaka, both of Japan

[21] Appl. No.: 165,164

[22] Filed: Dec. 10, 1993

Related U.S. Application Data

[63] Continuation-in-part of Ser. No. 72,488, Jun. 7, 1993, Pat. No. 5,290,878.

[30] Foreign Application Priority Data

Dec. 11, 1992 [JP] Japan ................. 4-331580

[51] Int. Cl.$^6$ ................. C08L 9/06
[52] U.S. Cl. ................. 524/495; 524/526; 524/572; 525/237; 525/332.1; 525/332.2; 525/342; 152/209 R
[58] Field of Search .......... 524/495, 572, 526; 525/236, 237, 332.2, 332.9, 332.1, 332.3, 342; 152/209 R

[56] References Cited

U.S. PATENT DOCUMENTS

| | | | |
|---|---|---|---|
| 4,748,168 | 5/1988 | Kawakami et al. | 525/237 X |
| 4,946,887 | 8/1990 | Takino et al. | 525/237 X |
| 5,290,878 | 3/1994 | Yamamoto et al. | 525/332.2 |

FOREIGN PATENT DOCUMENTS

| | | |
|---|---|---|
| 2625213 | 6/1989 | France . |
| 63-118302 | 5/1988 | Japan . |
| 2160207 | 12/1985 | United Kingdom . |

OTHER PUBLICATIONS

Chem. Abs. 91(20): 158841p, Relationship of carbon black ....

*Primary Examiner*—Fred Teskin

[57] ABSTRACT

A rubber composition for tire treads comprising a rubber component consisting essentially of (A) 20 to 100% by weight of a solution-polymerized styrene-butadiene copolymer rubber having a Mooney viscosity $ML_{1+4}$ of 30 to 200 at 100° C. prepared by copolymerization of styrene, butadiene and a polyvinyl aromatic compound followed by coupling with a trifunctional or tetrafunctional coupling agent, and (B) 0 to 80% by weight of at least one rubber selected from the group consisting of an emulsion-polymerized styrene-butadiene rubber, a butadiene rubber, natural rubber and a synthetic polyisoprene rubber; and (C) 50 to 250 parts by weight of a carbon black having an iodine adsorption number of not less than 60 mg/g and an oil absorption of not less than 110 ml/100 g per 100 parts by weight of said rubber component; the tan δ peak temperature Tg of the cured product of said rubber composition being from −40° to +5° C. The tread rubber composition can be processed without causing bagging with a good dispersibility of carbon black and provides tires having a low rolling resistance and a high grip characteristic.

6 Claims, No Drawings

RUBBER COMPOSITION FOR TIRE TREADS

CROSS-REFERENCE TO RELATED APPLICATION

This application is a continuation-in-part of application Ser. No. 08/072,488 filed on Jun. 7, 1993, now U.S. Pat. No. 5,290,878 the entire contents of which are hereby incorporated by reference.

BACKGROUND OF THE INVENTION

The present invention relates to rubber compositions suitable for tire treads, and more particularly to rubber compositions suitable for use in treads of radial tires for passenger cars and treads of racing car tires.

In order to reduce running fuel cost of automobiles, decrease in rolling resistance of tires and lightening in weight of automobile parts including tire have hitherto been demanded as well as improvement in efficiency of engine and auxiliaries. It is the most effective for reducing the rolling resistance of tires to reduce the energy loss of rubbers used in respective components of a tire, particularly the energy loss of a rubber of tread which accounts for a large volume.

When natural rubber (NR) or butadiene rubber (BR) is used in order to reduce the energy loss of tread rubber, the rolling resistance is reduced, but the wet grip is simultaneously reduced. For such a reason, in recent years, solution-polymerized styrene-butadiene rubbers wherein the styrene content and the vinyl bond content are regulated within specific ranges, have been proposed and used, thereby achieving the reduction of the rolling resistance while maintaining or improving the wet grip characteristics of tires.

Also, in recent years, lightening of automobiles advances with development of improved engines, thus automobiles of low fuel cost having high performances have been developed. With the development of such automobiles, tires having a low rolling resistance, a high grip characteristic and a high steering stability have been increasingly demanded. For meeting such a demand, solution-polymerized styrene-butadiene rubbers having a higher than δ peak temperature (Tg) have been used with carbon black having a low energy loss in order to obtain high grip characteristics. In case of tires for racing cars which require to stably maintain a particularly high grip characteristic up to the latter stage of racing, a large quantity of a process oil such as aromatic oil is incorporated in addition to the use of the solution-polymerized SBR having a high Tg and the carbon black.

However, combination use of a solution-polymerized SBR having a high Tg with a carbon black having a low energy loss raises a problem that bagging (namely the phenomenon that a rubber winding on a roll rises to the surface of the roll, so cut and rubber sending operations become impossible), is easy to occur during processing steps, particularly on a warming mill such as load mill, surge mill or feed mill when warming a tread rubber prior to extruding it. The occurrence of bagging may make tire manufacturing impossible since it is difficult to feed a rubber to an extruder for tread production.

Also, in case of rubber compositions for racing car tires, since they contain a large amount of a process oil, the torque in a Banbury mixer does not rise when milling the compositions, thus bad dispersion of carbon black or other ingredients is easy to occur. This problem has been solved by remilling, but lowering of productivity is unavoidable.

It is an object of the present invention to provide a rubber composition suitable for use in treads of automobile tires and having a low rolling resistance, a high grip characteristic and a good processability.

A further object of the present invention is to provide a rubber composition suitable for use in treads of tires for automobiles, particularly radial tires for passenger cars, which has a low rolling resistance and a high grip characteristic, and further has a good processability such that it does not cause bagging during processing.

A still further object of the present invention is to provide a rubber composition suitable for use in treads of tires for racing cars, which has a particularly high grip characteristic and, moreover, which has an excellent milling workability.

Another object of the present invention is to provide a tire for automobiles having a low rolling resistance, a high grip characteristic, a high steering stability and an excellent processability.

These and other objects of the present invention will become apparent from the description hereinafter.

SUMMARY OF THE INVENTION

In accordance with the present invention, there is provided a rubber composition for tire treads comprising:

a rubber component consisting essentially of (A) 20 to 100% by weight of a solution-polymerized styrene-butadiene copolymer rubber having a Mooney viscosity $ML_{1+4}$ of 30 to 200 at 100° C. prepared by copolymerization of styrene, butadiene and a polyvinyl aromatic compound followed by coupling with a trifunctional or tetrafunctional coupling agent, and (B) 0 to 80% by weight of at least one rubber selected from the group consisting of an emulsion-polymerized styrene-butadiene rubber, a butadiene rubber, natural rubber and a synthetic polyisoprene rubber; and (C) 50 to 250 parts by weight of a carbon black having an iodine adsorption number of not less than 60 mg/g and an oil absorption of not less than 110 ml/100 g per 100 parts by weight of said rubber component;

the tan δ peak temperature Tg of the cured product of said rubber composition being from −40° to +5° C.

The tread rubber compositions according to the present invention comprises the above-mentioned components (A), (B) and (C), and usually contain other additives known for use in rubbers. The compositions can be processed without causing bagging and provide tires having a low rolling resistance and a high grip characteristic. Even if an increased amount of a process oil is incorporated in the compositions for the purpose of providing racing car tires, the compositions can be milled in a high efficiency.

DETAILED DESCRIPTION

The solution-polymerized styrene-butadiene copolymer rubber (A) is prepared by copolymerizing styrene, butadiene and a polyvinyl aromatic compound in a known living anionic polymerization manner and then coupling the produced copolymer with a trifunctional or tetrafunctional coupling agent. For example, the copolymer rubber (A) is suitably prepared by a process which comprises copolymerizing styrene, butadiene and a polyvinyl aromatic compound in a hydrocarbon solvent in the presence of an organolithium compound as a polymerization initiator to produce a copolymer having lithium at either or both polymer chain ends, adding a trifunctional or tetrafunctional coupling agent to the reaction mixture, and carrying out the coupling reaction to give the solution-polymerized SBR. The whole amount of the polyvinyl aromatic compound may be added to the polymerization system in the initial stage of the polymerization. Alternatively, the polyvinyl aromatic compound may be gradually added to the system in a continuous or intermittent manner during the polymerization. Further, a part of the compound may be used after the coupling reaction with a tri- or tetrafunctional coupling agent.

Examples of the polyvinyl aromatic compound used in the present invention are, for instance, divinylbenzene, 1,2,4-trivinylbenzene, 1,3,5-trivinylbenzene, 1,3-divinylnaphthalene, 1,8-divinylnaphthalene, 1,2-divinyl-3,4-dimethylbenzene,2,4-divinylbiphenyl, 3,5,4'-trivinylbiphenyl, and the like. The polyvinyl aromatic compounds may be used alone or in admixture thereof. Among them, divinylbenzene is preferable from the viewpoint of easiness in industrial availability, and a mixture of the ortho, meta and para compounds which is industrially available, can be used.

The amount of the polyvinyl aromatic compound is usually from 0.05 to 1 mole, preferably 0.1 to 0.6 mole, per mole of the organolithium initiator. When the amount is less than the above range, copolymers having a preferable molecular weight distribution are not obtained, so the obtained copolymers are poor in processability. When the amount is more than the above range, the viscosity of the polymerization solution remarkably increases, thus the controllability in the production is lowered, and also undesirable side reactions such as gellation occur.

Known trifunctional or tetrafunctional coupling agents can be used. Examples of the coupling agent are, for instance, silicon tetrachloride, silicon tetrabromide, silicon tetraiodide, germanlure tetrachloride, tin tetrachloride, methyltrichlorosilane, butyl tin trichloride, bistrichlorosilylethane and bistrichloroethane. The coupling agents may be used alone or in admixture thereof. Silicon tetrachloride and tin tetrachloride are preferred from the viewpoints of reactivity and industrial availability.

The amount of the trifunctional or tetrafunctional coupling agent is usually from 0.03 to 0.3 mole, preferably from 0.05 to 0.2 mole, per mole of the organolithium initiator. When the amount of the coupling agent is less than the above range, copolymers having a preferable molecular weight distribution are not obtained, so the obtained copolymers are poor in processability. When the amount is more than the above range, the effect of improving the processability reaches maximum and does not increase even if the amount is increased, thus economically disadvantageous.

The Mooney viscosity ($ML_{1+4}$, 100° C.) of the copolymer rubber (A) used in the present invention is from 30 to 200, preferably 40 to 150. When the Mooney viscosity is more than the above range, the state of mixing in by the preparation of rubber compositions by mixing the rubber component with additives tends to deteriorate. When the Mooney viscosity is less than the above range, the resilience characteristic and abrasion resistance of tire treads tend to deteriorate.

It is preferable that the solution-polymerized SBR (A) used in the present invention has a bound styrene content of 5 to 60% by weight. More preferably, the content of bound styrene in the copolymer is from 10 to 50% by weight, especially 15 to 50% by weight, more especially 15 to 40% by weight. When the bound styrene content is less than the above range, the wet grip characteristic tends to decrease, and when the bound styrene content is more than the above range, the rolling resistance and low temperature characteristics tend to decrease.

When it is desired to prepare rubber compositions for racing car tires, it is preferable to use the solution-polymerized SBR having a bound styrene content of 20 to 60% by weight, especially 20 to 50% by weight, more especially 25 to 45% by weight. If the bound styrene content is less than 20% by weight, satisfactory grip characteristic required for running in racing is hard to obtain. If the bound styrene content is excessive, there is a tendency that the grip characteristic in the initial stage of running and the abrasion resistance of racing car tires are deteriorated. The content of bound styrene in the copolymer rubbers is determined by a refractive index method.

The content of vinyl bond in the butadiene moiety of the solution-polymerized SBR (A) used in the present invention is from 10 to 80% by mole, preferably 20 to 70% by mole, more preferably 20 to 60% by mole. When the vinyl bond content is too low, the wet grip characteristic and the grip characteristic in racing running tend to deteriorate. When the vinyl bond content is too high, the strength of treads is decreased, resulting in deterioration of abrasion resistance. Also, the copolymers having a vinyl content exceeding the above range is difficult to industrially produce. The content of vinyl bond is measured by infrared spectroscopy.

A Lewis basic compound may be used in the solution polymerization in order to control the content of vinyl bonds in the butadiene moiety of the produced copolymer rubber. Various kinds of Lewis basic compounds can be used, but ether compounds and tertiary amine compounds are preferred from the viewpoint of their availability in industrially practicing the invention. Examples of the ether compounds are, for instance, cyclic ethers such as tetrahydrofuran, tetrahydropyran and 1,4-dioxane; aliphatic monoethers such as diethyl ether and dibutyl ether; aliphatic polyethers such as ethyleneglycol dimethyl ether, ethyleneglycol diethyl ether, ethyleneglycol dibutyl ether, diethyleneglycol diethyl ether and diethyleneglycol dibutyl ether; aromatic ethers such as diphenyl ether and anisole, and the like. Examples of the tertiary amine compounds are, for instance, triethylamine, tripropylamine, tributylamine, and other compounds such as N,N,N',N'-tetramethylethylenediamine, N,N-diethylaniline, pyridine and quinoline, and the like.

The solution polymerization temperature varies depending on the desired microstructure of the copolymer rubber to be produced. Preferably, it is selected from 0° to 150° C., especially from 30° to 80° C., from the viewpoints of economy and side reaction.

It is preferable that the solution-polymerized SBR used in the tread rubber composition of the present invention has a molecular weight distribution such that the molecular weight distribution curve obtained by a high performance liquid chromatography, wherein the axis of ordinates is weight fraction and the axis of abscissas is molecular weight, has at least three peaks, and in the region of molecular weight of not less than 100,000 in terms of standard polystyrene, the proportion of high molecular weight polymer chains having a molecular weight which is equal to 5 times or more the molecular weight in terms of standard polystyrene corresponding to the top of a peak which appears on the lowest molecular weight side of the chromatogram, is from 5 to 60% by weight, preferably 10 to 40% by weight, based on the entire copolymer. The three or more peaks may be located anywhere in the molecular weight distribution curve. The location and the number of peaks are controlled by the amounts of the coupling agent and polyvinyl aromatic compound used. When the content of the above-defined higher molecular weight polymer chains in the copolymer is too large or is too small, the processability tends to deteriorate. Also, if the number of peaks in the molecular weight distribution curve is less than 3, no effect of improving the processability is seen.

The solution-polymerized SBR (A) may be used, as the rubber component of the tread rubber composition, in combination with other known rubbers. Preferably, at least one of rubbers selected from an emulsion-polymerized styrene-butadiene rubber prepared in a usual manner, a butadiene rubber, natural rubber and a synthetic isoprene rubber are used as the other rubber component (B).

The proportion of the solution-polymerized SBR (A) in the rubber component of the composition, namely the proportion based on the total weight of the components (A) and (B), is from 20 to 100% by weight, preferably 30 to 100% by weight, more preferably 40 to 100% by weight. When the proportion of the component (A) is too small, the wet grip characteristic and the grip and rolling resistance characteristics in racing deteriorate, and a balance between the dispersibility of carbon black or the like and the grip characteristics tends to deteriorate.

The proportion of the other rubber (B) in the rubber component of the composition is from 80 to 0% by weight, preferably 70 to 0% by weight, more preferably 60 to 0% by weight. The solution-polymerized SBR (A) may be used alone as the rubber component, but the use thereof with the component (B) produces a more remarkable effect on the processability. When the proportion of the component (B) is too large, the wet grip characteristic and the grid and rolling resistance characteristics in racing deteriorate, and a balance between the dispersibility of carbon black or the like and the grip characteristics tends to deteriorate.

The carbon black (C) used in the present invention is those having an iodine adsorption number of not less than 60 mg/g, preferably not less than 100 mg/g, and an oil absorption of not less than 110 ml/100 g. Preferably, the iodine adsorption number of the carbon black is not more than 250 mg/g, especially not more than 150 mg/g, and the oil absorption of the carbon black is not more than 250 ml/100 g, especially not more than 160 ml/100 g. When the iodine adsorption number is less than 60 mg/g, the grip characteristic is decreased, and also the reinforcing effect is not sufficient, so the abrasion resistance of treads is decreased. When the oil absorption is less than 110 ml/100 g, the rolling resistance and abrasion resistance tend to deteriorate. In case of preparing tread rubber composition for racing car tires, it is preferred to use carbon black having an iodine adsorption number of not less than 100 mg/g, especially from 120 to 250 mg/g, and an oil absorption of not less than 110 ml/100 g, especially from 110 to 250 ml/100 g.

Examples of the carbon black (C) are, for instance, N351, N339, N220, N234 and N110 provided in ASTM. Carbon blacks N220 and N110 are preferred for racing car tires.

The carbon black (C) is used in an amount of 50 to 250 parts by weight per 100 parts by weight of the rubber component, namely the total of the rubbers used [typically component (A) plus component (B)]. In case of passenger car tires, the amount of the carbon black (C) is preferably selected from 50 to 130 parts by weight, especially from 55 to 110 parts by weight, per 100 parts by weight of the rubber component. In case of racing car tires, the amount of the carbon black (C) is preferably selected from 55 to 170 parts by weight per 100 parts by weight of the rubber component. When the amount is less than 50 parts by weight, the abrasion resistance of treads tends to decrease, and when the amount is more than 250 parts by weight, the rolling resistance deteriorates and also the kneading operation may become difficult.

The rubber compositions according to the present invention may contain various additives as generally used, e.g., a curing agent such as sulfur; an activator such as zinc oxide or stearic acid; a curing accelerator such as accelerator CZ (N-cyclohexyl-2-benzothiazyl-sulfenamide) or accelerator NS ( N-tert-butyl-2-benzothiazylsulfenamide); an antioxidant such as N,N'-diphenyl-p-phenylenediamine or N-isopropyl-N'-phenyl-p-phenylenediamine; a process oil such as aromatic oil, naphthene oil or paraffin oil; a filler such as calcium carbonate or talc; and other additives. The amounts of these additives are not particularly limited, but they should be selected so as not to impair the objects of the present invention, namely improvements in rolling resistance, grip characteristics and processability such as no occurrence of bagging and good dispersibility of carbon black or the like. In case of rubber compositions for racing car tires, a large amount of a process oil is generally used, but the rubber compositions according to the present invention have a good milling or kneading workability even in such a case and does not require remilling.

The components (A), (B) and (C) and other additives are mixed in a usual manner to give a uncured rubber, namely is a rubber composition. A tire tread is prepared by forming the uncured rubber into a predetermined shape and curing it. It is important that the cured product obtained by curing the rubber composition according to the present invention has a tan $\epsilon$ peak temperature Tg of $-40°$ to $+5°$ C. When Tg of the cured product of the rubber composition is lower than $-40°$ C., the tire treads tend to be inferior in the wet grip characteristic and the grip characteristic in racing. When Tg is higher than $5°$ C., the abrasion resistance, the low temperature characteristics such as grip characteristic on snow and the grip characteristic in the initial stage of running tend to deteriorate.

In case of usual radial tires, the tan $\delta$ peak temperature Tg of the cured product is selected from $-40°$ to $-5°$ C., preferably from $-35°$ to $-5°$ C. It is preferable that the uncured rubber prior to curing the composition has a stress retention of at least 50%, especially 50 to 100%. If the stress retention is less than 50%, the rubber composition causes bagging on rolls, and tends to be difficult to be fed to an extruder.

In case of racing car tires, the tan δ peak temperature Tg of the cured product is selected from −25° to +5° C., preferably from −20° to −5° C.

The stress retention of an uncured rubber is measured by the following method.

A uncured rubber is formed into a sheet having a thickness of 2 mm by calendering. Dumbbell test pieces are punched out of the sheet by a No. 1 dumbbell according to JIS K 6301. The test pieces are subjected to tensile test at temperature 70° C., tensile speed 500 mm/minute and initial elongation 20%, and the stress relaxation is then measured. The ratio of the stress value ($6_3$) 3 seconds later from indication of the maximum value to the maximum stress value ($6_{max}$) is defined as the stress retention.

$$\text{Stress retention } (K_s) = (6_3/6_{max}) \times 100\%$$

The tan δ peak temperature Tg of a cured rubber is determined from a tan δ dispersion curve measured using a viscoelasticity spectrometer made by Iwamoto Seisakusho Kabushiki Kaisha under conditions of frequency 10 Hz, initial strain 10%, amplitude ±0.25% and rate of temperature elevation 2° C./minute, wherein the temperature corresponding to the top of the peak is the tan δ peak temperature.

The tread rubber composition of the present invention is usually prepared by firstly mixing the components (A), (B) and (C) and additives other than curing agent and curing accelerator in a mixer such as Banbury mixer, and then mixing the resultant mixture with a curing agent and a curing accelerator.

The thus prepared rubber composition is formed into a predetermined shape and cured to give a tread, from which are obtained tires having excellent properties through general steps for manufacturing tires.

The present invention is more specifically described and explained by means of the following Examples and Comparative Examples in which all % and parts are by weight unless otherwise noted. It is to be understood that the present invention is not limited to the Examples.

EXAMPLE 1

A solution-polymerized styrene-butadiene copolymer rubber having a bound styrene content of 30% and a vinyl bond content in butadiene moiety of 40% by mole was prepared by adding predetermined amounts of 1,3-butadiene, styrene, n-hexane, tetrahydrofuran, n-butyllithium and divinyl benzene ( a mixture of ortho-, meta- and para-divinyl benzenes) to a reactor, carrying out a polymerization, adding silicon tetrachloride as a coupling agent to the reaction mixture and carrying out a coupling reaction with stirring.

A molecular weight distribution of the obtained copolymer was measured at room temperature by a high performance liquid chromatograph HLC-TWINCLE made by Nippon Bunko Kogyo Kabushiki Kaisha (distribution column Shodex 80M made by Showa Denko Kabushiki Kaisha, developing solvent tetrahydrofuran). Three peaks were observed in the obtained molecular weight distribution curve (high performance liquid chromatogram). The weight proportion based on the whole polymer chains of polymer chains having a molecular weight of at least 5 times the molecular weight (in terms of standard polystyrene) which corresponded to the top of the peak located on the lowest molecular weight side of the chromatogram, namely weight % content of specific high molecular weight polymer chains in the copolymer, was 30%.

The Mooney viscosity of the obtained copolymer was 60, which was measured by a Mooney viscometer model SMV201 made by Shimadzu Corporation.

This solution-polymerized SBR was mixed with other components and additives shown in Table 1 by a Banbury mixer to give a tread rubber composition.

The tread rubber composition was extruded by a triple box type extruder to give steel radial tires (195/65R15).

The thus prepared tread rubber composition and tire were tested with respect to the following properties. The results are shown in Table 2.

(1) Stress retention of uncured rubber (rubber composition) (%): measured according to the above-mentioned method (2) Tan δ peak temperature Tg (° C.) of cured rubber composition: measured according to the above-mentioned method (3) Mill bagging upon extruding:

Occurrence or non-occurrence of bagging was observed during the production of tires.

(4) Rolling resistance:

The prepared steel radial tire was tested using a uniaxial drum tester under conditions of 80 km/hour in speed, 2.0 kg/cm$^2$ in inner air pressure and 400 kg in load. The rolling resistance was represented as an index to the result of Comparative Example 3. The smaller the value, the better the rolling resistance characteristic.

(5) With grip characteristic:

The prepared steel radial tires were attached to a new 2000 cc passenger car. The car was run on an asphalt road. The degree of deceleration was calculated from the time required for deceleration from 40 kg/hour to 20 km/hour. The wet grip characteristic was represented as an index to the result of Comparative Example 3. The larger the value, the better the wet grip characteristic.

EXAMPLES 2 TO 5

Tread rubber compositions were prepared under the conditions shown in Table 1 according to the procedures of Example 1, and steel radial tires (195/65R15) were then prepared.

The tread rubber compositions and tires were tested in the same manner as in Example 1. The results are shown in Table 2.

Comparative Examples 1 to 6

Tread rubber compositions were prepared under the conditions shown in Table 1 according to the procedures of Example 1, and steel radial tires (195/65R15) were prepared.

The tread rubber compositions and tires were tested in the same manner as in Example 1. The results are shown in Table 2.

The rubber composition of Comparative Example 3 is a composition wherein an emulsion-polymerized styrene-butadiene rubber which has been the most generally used, and which does not cause bagging, and accordingly it was used as the standard for estimating characteristics of tires.

TABLE 1

|  | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| (A) | | | | | | | | | | | |
| Solution-polymerized SBR | | | | | | | | (SBR*5) | | | |
| Bound styrene content (%) | 30 | 15 | 35 | 35 | 35 | 30 | 24 | 23.5 | 40 | 30 | 30 |
| Vinyl content in butadiene moiety (mole %) | 40 | 40 | 45 | 45 | 45 | 40 | 13 | 18 | 50 | 40 | 40 |
| Number of peaks*1 | 3 | 3 | 3 | 3 | 3 | 2 | 1 | 1 | 2 | 3 | 3 |
| Content of specific high molecular weight polymer chains*2 (%) | 30 | 24 | 25 | 25 | 25 | 1 | 0 | 0 | 25 | 30 | 30 |
| Mooney viscosity (ML$_{1+4}$, 100° C.) | 60 | 45 | 55 | 55 | 55 | 50 | 58 | 52 | 55 | 60 | 60 |
| Amount of oil extender (phr) | 37.5 | 37.5 | 37.5 | 37.5 | 37.5 | 37.5 | 37.5 | 37.5 | 37.5 | 37.5 | 37.5 |
| Polyvinyl aromatic compound | Divinyl-benzene | Divinyl-benzene | Divinyl-benzene | Divinyl-benzene | Divinyl-benzene | None | None | None | None | Divinyl-benzene | Divinyl-benzene |
| Amount (phr) | 137.5 | 96.25 | 137.5 | 123.75 | 123.75 | 137.5 | 137.5 | 137.5 | 41.25 | 20.625 | 137.5 |
| (B) | | | | | | | | | | | |
| Other rubbers | — | SBR*5 | — | Poly-butadiene | Natural rubber | — | — | — | SBR*7 | SBR*6 | — |
| Amount (phr) | — | 41.25 | — | 10 | 10 | — | — | — | 96.25 | 116.875 | — |
| (C) | | | | | | | | | | | |
| Carbon black | N220 | N351 | N220 | N220 | N220 | N220 | N220 | N220 | N220 | N220 | N220 |
| Iodine adsoprtion number (mg/g) | 121 | 68 | 121 | 121 | 121 | 121 | 121 | 121 | 121 | 121 | 121 |
| Oil absorption (ml/100 g) | 114 | 120 | 114 | 114 | 114 | 114 | 114 | 114 | 114 | 114 | 114 |
| Amount (phr) | 90 | 90 | 82 | 82 | 82 | 90 | 90 | 90 | 90 | 90 | 140 |
| Additives | | | | | | | | | | | |
| Aromatic oil (phr) | 12.5 | 12.5 | — | 3.75 | 3.75 | 12.5 | 12.5 | 12.5 | 12.5 | 12.5 | 12.5 |
| Wax (phr) | 2 | 2 | 2 | 2 | 2 | 2 | 2 | 2 | 2 | 2 | 2 |
| Antioxidant*3 (phr) | 2 | 2 | 2 | 2 | 2 | 2 | 2 | 2 | 2 | 2 | 2 |
| Stearic acid (phr) | 2 | 2 | 2 | 2 | 2 | 2 | 2 | 2 | 2 | 2 | 2 |
| Zinc oxide (phr) | 3 | 3 | 3 | 3 | 3 | 3 | 3 | 3 | 3 | 3 | 3 |
| Sulfur (phr) | 1.75 | 1.75 | 1.75 | 1.75 | 1.75 | 1.75 | 1.75 | 1.75 | 1.75 | 1.75 | 1.75 |
| Accelerator*4 (phr) | 1 | 1 | 1 | 1 | 1 | 1 | 1 | 1 | 1 | 1 | 1 |

TABLE 2

|  | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| Stress retention of uncured rubber (%) | 55 | 58 | 52 | 53 | 57 | 45 | 42 | 60 | 52 | 56 | 43 |
| Tan δ peak temperature (°C.) | −16 | −31 | −6 | −10 | −8 | −16 | −42 | −30 | −4 | −18 | −16 |
| Mill bagging upon extruding | None | None | None | None | None | Occurrence | Occurrence | None | None | None | Occurrence |
| Rolling resistance | 97 | 88 | 98 | 95 | 97 | 98 | 90 | 100 | 110 | 107 | 105 |
| Wet grip index | 110 | 102 | 111 | 106 | 109 | 110 | 89 | 100 | 100 | 105 | 109 |

(Notes in Table 2)
*1Number of the peaks of a molecular weight distribution curve (ordinate: weight fraction, abscissa: molecular weight) obtained by high performance liquid chromatography
*2Weight proportion based on the whole polymer chains, of polymer chains having a molecular weight which is equal to 5 times or more the molecular weight in terms of standard polystyrene which corresponds to the position of the top of the peak located on the lowest molecular weight side of a molecular weight distribution curve obtained by high performance liquid chromatography
*3N,N'-diphenyl-p-phenylenediamine
*4N-cyclohexyl-2-benzothiazylsulfenamide
*5Emulsion-polymerized styrene-butadiene rubber SBR 1712 [bound styrene content 23.5%, vinyl bond content 18% by mole, amount of oil extender 37.5 phr based on the rubber of component (B)]
*6Emulsion-polymerized styrene-butadiene rubber [bound styrene content 35%, vinyl bond content 18% by mole, amount of oil extender 37.5 phr based on the rubber of component (B)]
*7Emulsion-polymerized styrene-butadiene rubber [bound styrene content 45%, vinyl bond content 18% by mole, amount of oil extender 37.5 phr based on the rubber of component (B)]

From the data shown in Tables 1 and 2, it is observed that:

the composition of Comparative Example 1 causes bagging since it contains a solution-polymerized SBR but no polyvinyl aromatic compound is used in the preparation of the solution-polymerized SBR;

the composition of Comparative Example 2 is very poor in wet grip characteristic since Tg of the cured product is low;

the composition of Comparative Example 3 is very poor in rolling resistance characteristic since Tg of the cured product is high;

the composition of Comparative Example 5 is poor in rolling resistance characteristic since it contains a solution-polymerized SBR prepared using divinyl benzene which is the same SBR as used in Example 1 but the amount of SBR used is small; and the composition of Comparative Example 6 causes bagging and is high in rolling resistance, since it contains the same solution-polymerized SBR as in Example 1 but it contains a large amount of carbon black, thus the stress retention of uncured rubber is small.

It is also observed that the composition of Example 1 does not cause bagging and is superior in both rolling resistance characteristic and wet grip characteristic to the composition of Comparative Example 3 which has hitherto been generally used, since the solution-polymerized SBR used therein contains divinyl benzene in the molecular chains and, therefore, the stress retention of uncured rubber is as high as 55%, though the bound styrene content and vinyl bond content are similar to those in Comparative Example 1.

In the compositions of Examples 2, 4 and 5, the solution-polymerized SBR (A) is used in combination with an emulsion-polymerized SBR, polybutadiene or natural rubber as the component (B). It is observed that these compositions also have improved characteristics.

It is also observed that the composition of Example 3 wherein a solution-polymerized SBR capable of providing a cured rubber having a relatively high Tg is used, is particularly superior in wet grip characteristics.

EXAMPLE 6

A solution-polymerized styrene-butadiene copolymer rubber having a bound styrene content of 35% and a vinyl bond content in butadiene moiety of 45% by mole was prepared by adding predetermined amounts of 1,3-butadiene, styrene, n-hexane, tetrahydrofuran, n-butyllithium and divinyl benzene ( a mixture of ortho-, meta- and para-divinyl benzenes) to a reactor, carrying out a polymerization, adding silicon tetrachloride as a coupling agent to the reaction mixture and carrying out a coupling reaction with stirring.

A molecular weight distribution of the obtained copolymer was measured at room temperature by a high performance liquid chromatograph HLC-TWINCLE made by Nippon Bunko Kogyo Kabushiki Kaisha (distribution column Shodex 80M made by Showa Denko Kabushiki Kaisha, developing solvent tetrahydrofuran). Three peaks were observed in the obtained molecular weight distribution curve (high performance liquid chromatogram). The weight proportion based on the whole polymer chains of polymer chains having a molecular weight of at least 5 times the molecular weight (in terms of standard polystyrene) which corresponded to the top of the peak located on the lowest molecular weight side of the chromatogram, namely weight % content of specific high molecular weight polymer chains in the copolymer, was 30%.

The Mooney viscosity of the obtained copolymer was 55, which was measured by a Mooney viscometer model SMV201 made by Shimadzu Corporation.

This solution-polymerized SBR was mixed with other components and additives shown in Table 3 by a Banbury mixer to give a tread rubber composition.

Slick tires (front 10×3.60-5, rear 11×6.00-5) for racing car were prepared using the thus prepared tread rubber composition.

The thus prepared tread rubber composition and tires were tested with respect to the following properties. The results are shown in Table 4.

(1) Torque in Banbury mixer ( index):
  A tread rubber composition was kneaded by a Banbury mixer and the torque loaded on the rotor was measured. The torque is shown as an index to the torque for Example 6 regarded as 100.

(2) Tan δ peak temeprature Tg of cured composition (° C.):
  Same as above.

(3) Carbon dispersibility (%):
  The state of dispersion of carbon black in a cured rubber composition was measured by a Dunlop method (Leigh-Dugmore method) (cf. Journal of the Society of Rubber Industry, Japan, No. 4, 1968).

(4) Grip characteristic:
  The prepared slick tires were attached to a racing cart of 100 cc cubic capacity. The cart was run around a 1013 m circuit 7 times, and the grip characteristic was sensuously estimated. The "grip in the first half" shows a grip characteristic estimated when running aroung the circuit 2 to 4 times, and the "grip in the second half" shows the grip characteristic estimated when running around the circuit 5 to 7 times. The grip characteristic was estimated by 5 rating method wherein the estimation for Example 6 was regarded as "3".

EXAMPLES 7 TO 9 AND COMPARATIVE EXAMPLES 7 to 11

Tread rubber compositions were prepared under the conditions shown in Table 3 according to the procedures of Example 6, and slick tires were prepared.

The tread rubber compositions and tires were tested in the same manner as in Example 6. The results are shown in Table 4.

TABLE 3

|  | Ex. 6 | Ex. 7 | Ex. 8 | Ex. 9 | Com. Ex. 7 | Com. Ex. 8 | Com. Ex. 9 | Com. Ex. 10 | Com. Ex. 11 |
|---|---|---|---|---|---|---|---|---|---|
| (A) |  |  |  |  |  |  |  |  |  |
| Solution-polymerized SBR |  |  |  |  |  |  | (SBR) |  |  |
| Bound styrene content (%) | 35 | 35 | 35 | 35 | 35 | 35 | 45 | 24 | 60 |
| Vinyl content in butadiene moiety (mole %) | 45 | 45 | 45 | 45 | 45 | 45 | 18 | 13 | 18 |
| Number of peaks*1 | 3 | 3 | 3 | 3 | 3 | 3 | 1 | 1 | 1 |
| Content of specific high molecular weight polymer chains*2 (%) | 25 | 25 | 25 | 25 | 25 | 25 | 0 | 0 | 0 |
| Mooney viscosity (ML$_{1+4}$, 100° C.) | 55 | 55 | 55 | 55 | 55 | 55 | 50 | 58 | 65 |
| Amount of oil extender (phr) | 37.5 | 37.5 | 37.5 | 37.5 | 37.5 | 37.5 | 37.5 | 37.5 | 37.5 |
| Polyvinyl aromatic compound | Divinyl-benzene | Divinyl-benzene | Divinyl-benzene | Divinyl-benzene | None | Divinyl-benzene | None | None | None |
| Amount (phr) | 137.5 | 110 | 123.75 | 123.75 | 137.5 | 41.25 | 137.5 | 137.5 | 137.5 |
| (B) |  |  |  |  |  |  |  |  |  |
| Other rubbers | — | SBR*9 | Poly- | Natural | — | SBR*9 | — | — | — |

TABLE 3-continued

|  | Ex. 6 | Ex. 7 | Ex. 8 | Ex. 9 | Com. Ex. 7 | Com. Ex. 8 | Com. Ex. 9 | Com. Ex. 10 | Com. Ex. 11 |
|---|---|---|---|---|---|---|---|---|---|
|  |  |  | butadiene | rubber |  |  |  |  |  |
| Amount (phr) | — | 27.5 | 10 | 10 | — | 96.25 | — | — | — |
| (C) |  |  |  |  |  |  |  |  |  |
| Carbon black | N110 | N110 | N110 | N110 | N110 | N110 | N110 | N110 | N110 |
| Iodine adsorption number (mg/g) | 145 | 145 | 145 | 145 | 145 | 145 | 145 | 145 | 145 |
| Oil absoprtion (ml/100 g) | 113 | 113 | 113 | 113 | 113 | 113 | 113 | 113 | 113 |
| Amount (phr) | 100 | 100 | 100 | 100 | 100 | 100 | 100 | 100 | 100 |
| Additives |  |  |  |  |  |  |  |  |  |
| Aromatic oil (phr) | 62.5 | 62.5 | 66.25 | 66.25 | 62.5 | 62.5 | 62.5 | 62.5 | 62.5 |
| Wax (phr) | 2 | 2 | 2 | 2 | 2 | 2 | 2 | 2 | 2 |
| Antioxidant[*3] (phr) | 2 | 2 | 2 | 2 | 2 | 2 | 2 | 2 | 2 |
| Stearic acid (phr) | 2 | 2 | 2 | 2 | 2 | 2 | 2 | 2 | 2 |
| Zinc oxide (phr) | 3 | 3 | 3 | 3 | 3 | 3 | 3 | 3 | 3 |
| Sulfur (phr) | 1.2 | 1.2 | 1.2 | 1.2 | 1.2 | 1.2 | 1.2 | 1.2 | 1.2 |
| Accelerator[*4] (phr) | 2 | 2 | 2 | 2 | 2 | 2 | 2 | 2 | 2 |

TABLE 4

|  | Ex. 6 | Ex. 7 | Ex. 8 | Ex. 9 | Com. Ex. 7 | Com. Ex. 8 | Com. Ex. 9 | Com. Ex. 10 | Com. Ex. 11 |
|---|---|---|---|---|---|---|---|---|---|
| Torque in Banbury mixer (index) | 100 | 105 | 102 | 102 | 95 | 108 | 110 | 102 | 110 |
| Tan δ peak temperature (°C.) | −6 | −6 | −7 | −7 | −6 | −6 | −6 | −42 | +15 |
| Grip characteristic |  |  |  |  |  |  |  |  |  |
| Grip in the first half | 3 | 3.1 | 2.9 | 2.9 | 2.8 | 3.2 | 3.2 | 1.3 | 1.5 |
| Grip in the second half | 3 | 2.9 | 3.0 | 3.1 | 2.9 | 2.6 | 2.5 | 1.4 | 2.6 |
| Carbon dispersibility (%) | 95 | 97 | 96 | 96 | 87 | 98 | 96 | 97 | 98 |

(Notes in Table 3)
[*8]N-tert-butyl-2-benzothiazylsulfenamide
[*9]Emulsion-polymerized styrene-butadiene rubber SBR commercially available under the trade mark "NIPOL" 9520 from Nippon Zeon Co., Ltd. [bound styrene content 45.0%, vinyl bond content 18% by mole, amount of oil extender 37.5 phr based on the rubber of the component (B)]

From the data shown in Tables 3 and 4, it is observed that:

- the composition of Comparative Example 7 is low in torque in Banbury mixer and is poor in dispersibility of carbon black since it contains a solution-polymerized SBR but no polyvinyl aromatic compound is used in the preparation of the solution-polymerized SBR;
- the composition of Comparative Example 8 is poor in the grip in the second half, thus poor in persistency of grip characteristic, since it contains a solution-polymerized SBR prepared using divinyl benzene which is the same SBR as used in Example 6 but the amount of SBR used is small; and
- the composition of Comparative Example 9 is also poor in persistency of grip characteristic like Comparative Example 8, since an emulsion-polymerized SBR is used;
- the composition of Comparative Example 10 is poor in grip characteristic because of low Tg; and
- the composition of Comparative Example 11 is poor in the grip in the first half, thus poor in the grip characteristic in the initial stage of running.

It is also observed that the composition of Example 6 is high in torque in Banbury mixer and has a good dispersibility of carbon black, and it also has a good grip characteristic, since the solution-polymerized SBR used therein contains divinyl benzene in the molecular chains, though the bound styrene content and vinyl bond content are similar to those in Comparative Example 7.

In the compositions of Examples 7 to 9, the solution-polymerized SBR (A) is used in combination with an emulsion-polymerized SBR, polybutadiene or natural rubber as the component (B). It is observed that these compositions have a higher dispersibility of carbon black because of higher torque in Banbury mixer, and moreover they have a good grip characteristic.

As understood from the results shown in the Tables, the tread rubber compositions according to the present invention have a decreased rolling resistance and increased grip characteristics, and moreover have an excellent processability or workability such that bagging does not occur during the processing, and milling operation is so easy as to make the dispersibility of carbon black good.

In addition to the ingredients used in the Examples, other ingredients can be used as set forth in the specification to obtain substantially the same results.

What we claim is:

1. A rubber composition for tire tread comprising:
   a rubber component consisting essentially of (A) 20 to 100% by weight of a solution-polymerized styrene-butadiene copolymer rubber having a Mooney viscosity $ML_{1+4}$ of 30 to 200 at 100° C. prepared by copolymerization of styrene, butadiene and a polyvinyl aromatic compound followed by coupling with a trifunctional or tetrafunctional coupling agent, and (B) 0 to 80% by weight of at least one rubber selected from the group consisting of an emulsion-polymerized styrene-butadiene rubber, a butadiene rubber, natural rubber and a synthetic polyisoprene rubber; and
   (C) 50 to 130 parts by weight of a carbon black having an iodine adsorption number of not less than 60 mg/g and an oil absorption of not less than 110 ml/100 g per 100 parts by weight of said rubber component;
   said rubber composition prior to curing having a stress retention of at least 50%, and the tan δ peak temperature Tg of the cured product of said rubber composition being from −40° to −5° C.

2. The composition of claim 1, wherein said solution-polymerized styrene-butadiene copolymer rubber (A) has a molecular weight distribution such that the molecular weight distribution curve obtained by a high performance liquid chromatography has at least three peaks, and 5 to 60% by weight of all the polymer chains have a molecular weight which is at least 5 times the molecular weight in terms of standard polystyrene corresponding to the peak appearing on the lowest molecular weight side of the high performance liquid chromatogram.

3. The composition of claim 1, wherein said solution-polymerized styrene-butadiene copolymer rubber (A) has a Mooney viscosity ($ML_{1+4}$, 100° C.) of 40 to 150.

4. The composition of claim 1, wherein said solution-polymerized styrene-butadiene copolymer rubber (A) has a bound styrene content of 5 to 50% by weight and a vinyl bond content of 10 to 80% by mole.

5. The composition of claim 1, wherein said rubber component is a mixture of the component (A) and the component (B).

6. The composition of claim 1, wherein said rubber component is a mixture of 40 to 100% by weight of the component (A) and 0 to 60% by weight of the component (B).

* * * * *